US007137887B2

(12) United States Patent
Gomez et al.

(10) Patent No.: US 7,137,887 B2
(45) Date of Patent: Nov. 21, 2006

(54) GAMING MACHINE WITH BONUS CHOICE CHANGING FEATURE

(75) Inventors: Benjamin T. Gomez, Chicago, IL (US); Peter W. Flemming, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 369 days.

(21) Appl. No.: 10/660,041

(22) Filed: Sep. 11, 2003

(65) Prior Publication Data

US 2005/0059473 A1 Mar. 17, 2005

(51) Int. Cl.
*A63F 13/00* (2006.01)

(52) U.S. Cl. .......................................................... 463/20

(58) Field of Classification Search .................. 463/16, 463/20, 25; 273/143 R, 138.1, 139
See application file for complete search history.

(56) References Cited

U.S. PATENT DOCUMENTS

| | | | | |
|---|---|---|---|---|
| 6,254,481 | B1 | 7/2001 | Jaffe | 463/20 |
| 6,375,187 | B1 | 4/2002 | Baerlocher | 273/143 R |
| 6,506,118 | B1 | 1/2003 | Baerlocher et al. | 463/25 |
| 6,517,433 | B1 | 2/2003 | Loose et al. | 463/20 |
| 6,569,015 | B1 | 5/2003 | Baerlocher et al. | |
| 6,569,018 | B1 | 5/2003 | Jaffe | 463/30 |
| 6,582,306 | B1 | 6/2003 | Kaminkow | |
| 6,599,192 | B1 | 7/2003 | Baerlocher et al. | 463/25 |
| 6,632,141 | B1 | 10/2003 | Webb et al. | |
| 6,648,754 | B1 | 11/2003 | Baerlocher et al. | |
| 6,692,355 | B1 | 2/2004 | Baerlocher et al. | |
| 6,719,632 | B1 | 4/2004 | Palmer et al. | |
| 6,758,750 | B1 | 7/2004 | Baerlocher et al. | |
| 6,793,579 | B1 | 9/2004 | Baerlocher et al. | |
| 6,796,905 | B1 | 9/2004 | Baerlocher et al. | |
| 6,808,452 | B1 | 10/2004 | Baerlocher et al. | |
| 6,811,483 | B1 | 11/2004 | Webb et al. | |
| 6,811,485 | B1 | 11/2004 | Kaminkow | |
| 6,852,030 | B1 | 2/2005 | Baerlocher et al. | |
| 6,890,257 | B1 | 5/2005 | Baerlocher | |
| 2002/0072402 | A1 | 6/2002 | Baerlocher | 463/16 |
| 2002/0142822 | A1 | 10/2002 | Baerlocher et al. | 463/16 |
| 2003/0040360 | A1 | 2/2003 | Kaminkow | 463/25 |
| 2003/0045344 | A1 | 3/2003 | Webb et al. | 463/20 |
| 2003/0064795 | A1 | 4/2003 | Baerlocher et al. | |
| 2003/0078093 | A1 | 4/2003 | Simms et al. | 463/20 |
| 2003/0162578 | A1 * | 8/2003 | Baerlocher et al. | 463/16 |
| 2003/0162584 | A1 | 8/2003 | Hughs-Baird et al. | 463/20 |
| 2003/0176215 | A1 | 9/2003 | Palmer et al. | |
| 2003/0211880 | A1 | 11/2003 | Locke | |
| 2003/0224846 | A1 | 12/2003 | Baerlocher | |
| 2004/0077403 | A1 | 4/2004 | Maya et al. | |
| 2004/0162128 | A1 | 8/2004 | Baerlocher et al. | |
| 2004/0180710 | A1 | 9/2004 | Palmer et al. | |
| 2004/0242302 | A1 | 12/2004 | Baerlocher | |
| 2005/0020342 | A1 | 1/2005 | Palmer et al. | |

(Continued)

*Primary Examiner*—Kim Nguyen
(74) *Attorney, Agent, or Firm*—Jenkens & Gilchrist

(57) ABSTRACT

A method and apparatus for conducting a wagering game are disclosed. A value input device receives a wager from a player to play the wagering game. A processor is operative to initially associate one or more of a plurality of incomplete offers with the player. A display is adapted to display the plurality of incomplete offers. The processor, in turn, is operative to allow the player to change which of the incomplete offers is associated with the player, and after the player changes which of the incomplete offers is associated with the player, complete the plurality of offers and award the associated offers to the player.

20 Claims, 19 Drawing Sheets

U.S. PATENT DOCUMENTS

| | | | | |
|---|---|---|---|---|
| 2005/0054413 | A1 | 3/2005 | Randall et al. | |
| 2005/0055115 | A1 * | 3/2005 | Gerrard et al. | 700/91 |
| 2005/0079908 | A1 | 4/2005 | Pacey | |
| 2005/0101375 | A1 | 5/2005 | Webb et al. | |
| 2005/0153767 | A1 | 7/2005 | Gauselmann | |

* cited by examiner

GAMING MACHINE WITH BONUS CHOICE CHANGING FEATURE

FIELD OF THE INVENTION

The present invention relates generally to gaming machines and, more particularly, to a gaming machine including a bonus selection feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by increasing the entertainment value and excitement for the player.

One concept originally employed to increase the entertainment value of a game is a bonus round, providing the player with a different game experience during play of the basic game. Typically, a predetermined set of symbols on the basic game triggers a bonus round. Bonus games take on a variety of themes and in many cases require the player to make choices that typically instill a feeling of control or self-destiny.

A concept often found in bonus games today is the selection of an animated character or object that potentially provides the player with a winning outcome. In many cases, the selection results in immediate feedback to the player of an award, a loss, or the completion of the bonus round. To enhance the entertainment of the bonus round, game developers have created longer series of events, but typically the player has little interaction once the initial selection has been made. An example of this might include a player choosing (from a group) an animated "partner" or "partners" that perform some feat to generate a winning outcome. While the player has the initial option of choosing this "partner", once the round commences, the player cannot intervene and must await the outcome. This limits the feeling of control the player has on the outcome of the bonus round. A method of changing the "partner" or "partners" in the middle of the round would assist in keeping the player more involved, enhance entertainment, and present the player with a feeling of self-destiny.

SUMMARY OF THE INVENTION

Generally, the present invention provides a method and apparatus for conducting a wagering game. A value input device receives a wager from a player to play the wagering game. A processor is operative to initially associate one or more of a plurality of incomplete offers with the player. A display is adapted to display the plurality of incomplete offers. The processor, in turn, is operative to allow the player to change which of the incomplete offers is associated with the player, and after the player changes which of the incomplete offers is associated with the player, complete the plurality of offers and award the associated offers to the player. In a preferred embodiment, the plurality of offers are in the form of award-generating characters from which the player chooses one or more "partners" during a bonus round.

BRIEF DESCRIPTION OF THE DRAWINGS

The foregoing and other advantages of the invention will become apparent upon reading the following detailed description and upon reference to the drawings in which.

Figure 1:
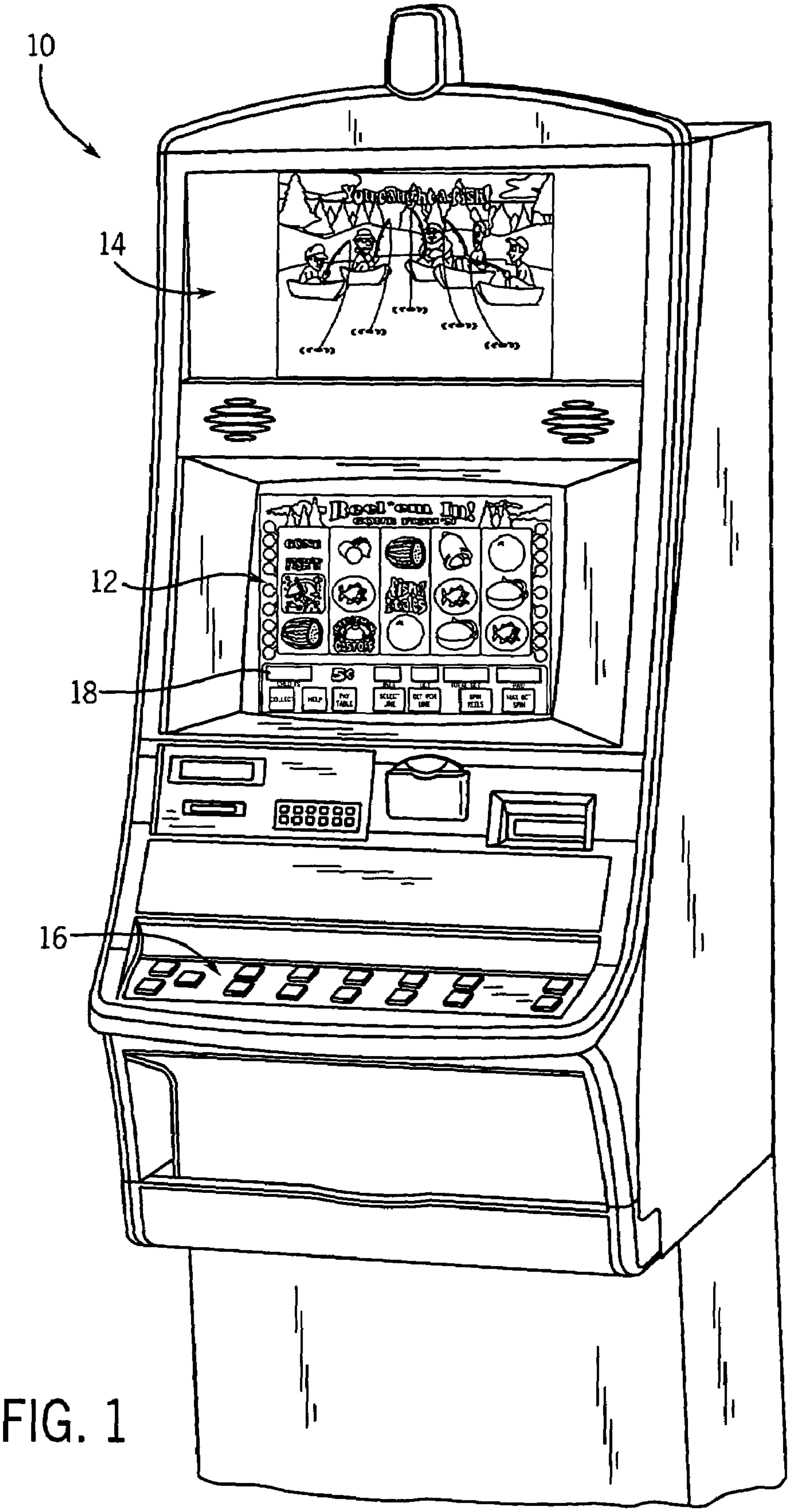
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a wagering game such as video slots, poker, keno, bingo, roulette, or blackjack. In operation, the gaming machine receives a wager from a player to purchase a "play" of the game. In a "play" of the game, the gaming machine generates at least one random event using a random number generator and provides an award to the player for a winning outcome of the random event. To portray the random event and outcome to the player, the gaming machine includes a video display 12. For a video reel slot game, the video display 12 portrays a plurality of simulated reels that are rotated and stopped to place symbols on the reels in visual association with one or more pay lines.

The video display 12 is preferably in the form of a liquid crystal display (LCD), cathode ray tube (CRT), plasma, or other type of video display known in the art. The display 12 preferably includes a touch screen 18 overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10. In addition to the display 12, the gaming machine 10 may include a secondary display 14 for displaying additional game information such as a bonus feature. The game may be operated by the touch screen 18 or by a button panel 16.

Figure 2:
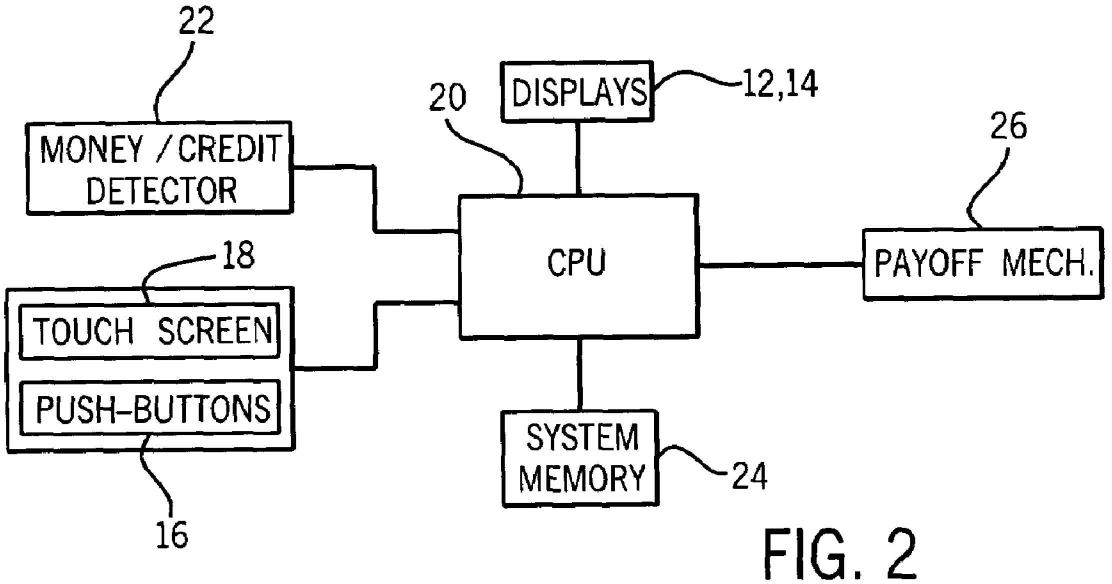
FIG. 2 is a block diagram of a control mechanism used for communication between interface components, a main processor, and display units.

FIG. 2 is a block diagram of a control system suitable for operating the gaming machine. Money/credit detector 22 signals a central processing unit (CPU) 20 when a player has inserted money or played a number of credits. The money may be provided by coins, bills, tickets, coupons, cards, etc. Using the button panel 16 and/or the touch screen 18, the player may select any variables associated with the wagering game and place his/her wager to purchase a play of the game. In a play of the game, the CPU 20 generates at least one random event using the random number generator and provides an award to the player for a winning outcome of the random event. The CPU 20 operates the display 12 to represent the random event(s) and outcome(s) in a visual form that can be understood by the player. In addition to the CPU 20, the control system may include one or more additional slave control units for operating one or more of the displays 12 and 14.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Referring back to FIG. 1, to play the reel slot game, a player selects a number of pay lines and places a wager on the selected lines using the button panel 16 and/or the touch screen 18. In response to pressing a "Spin Reels" button, the CPU spins and randomly stops the plurality of simulated reels on the display 12 to place symbols on the reels in visual association with the pay lines. Other mechanisms, such as a handle, may be used to set the reels in motion. The number of reels and pay lines may be varied to be more or less than what is illustrated. The CPU 20 uses the random number generator to select a game outcome (e.g., "basic" game outcome) corresponding to a particular set of reel "stop positions." The CPU 20 then causes each of the reels to stop at the appropriate stop position. Symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may be affixed to the machine 10 and/or displayed by the display 12 in response to a command by the player (e.g., by pressing a "Pay Table" key). A winning basic game outcome occurs when the symbols appearing on the reels along a pay line correspond to one of the winning combinations on the pay table. A winning combination, for example, could be a number of matching symbols along an active pay line, where the award is greater as the number of matching symbols along the pay line increases. If the displayed symbols stop in a winning combination, the game credits the player an amount corresponding to the award in the pay table for that combination multiplied by the number of credits wagered on the active pay line. The player may collect the amount of accumulated credits by pressing a "Collect" key.

Figure 3:
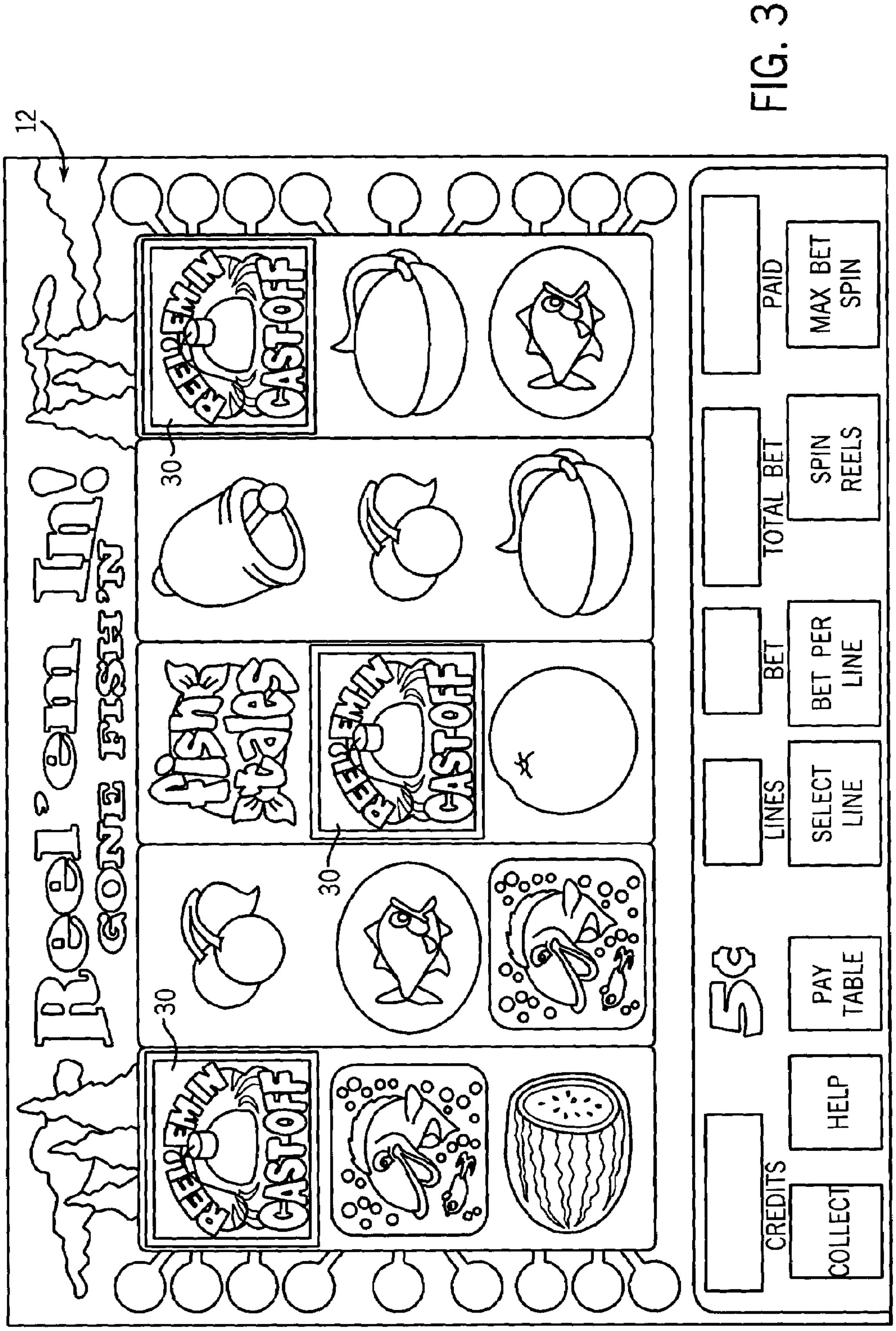
FIG. 3 is a display image associated with a basic slot game and showing a symbol combination for triggering a bonus feature.
Figure 4:
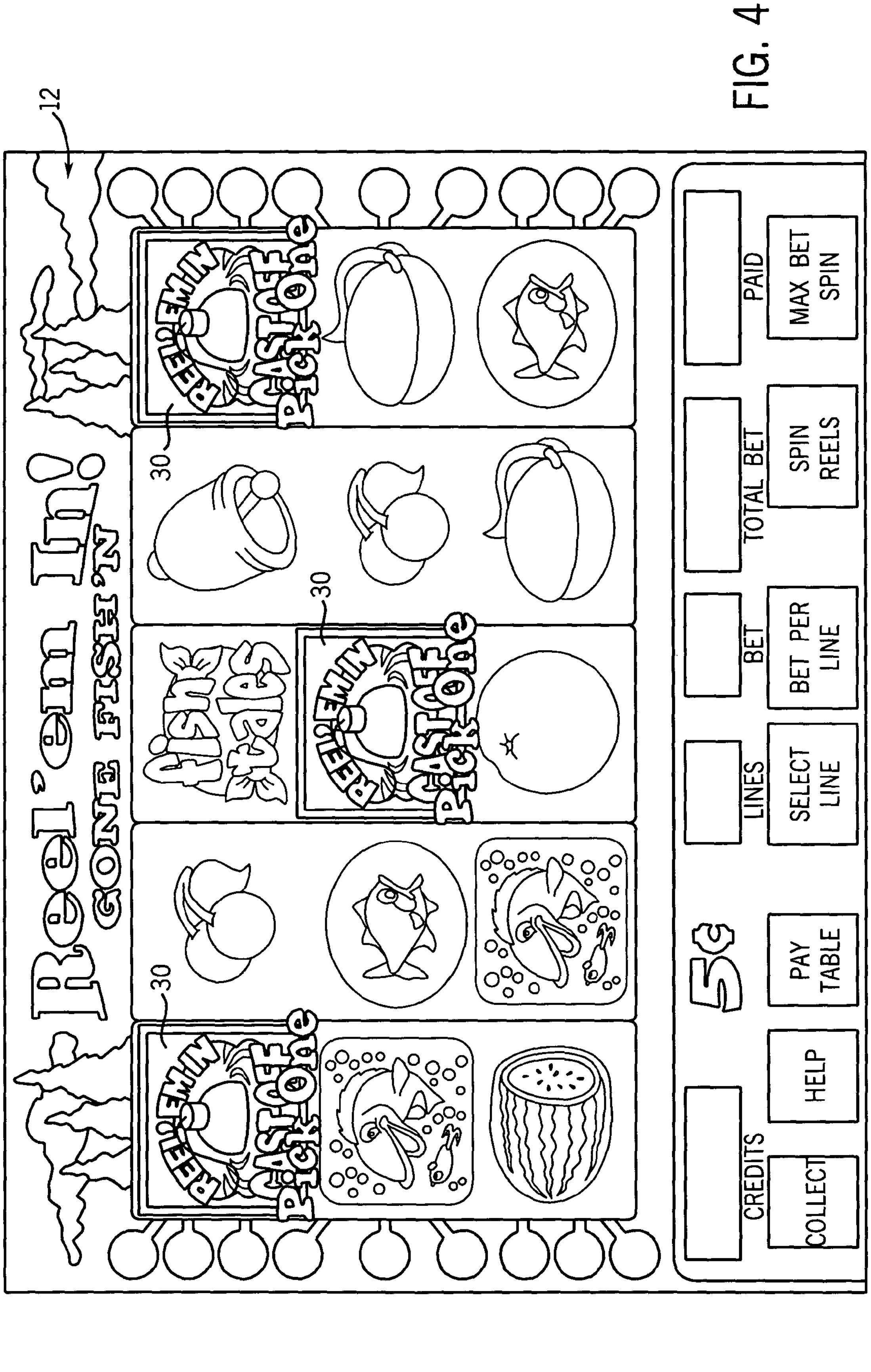
FIG. 4 is a display image showing an initial bonus round player selection.
Figure 5:
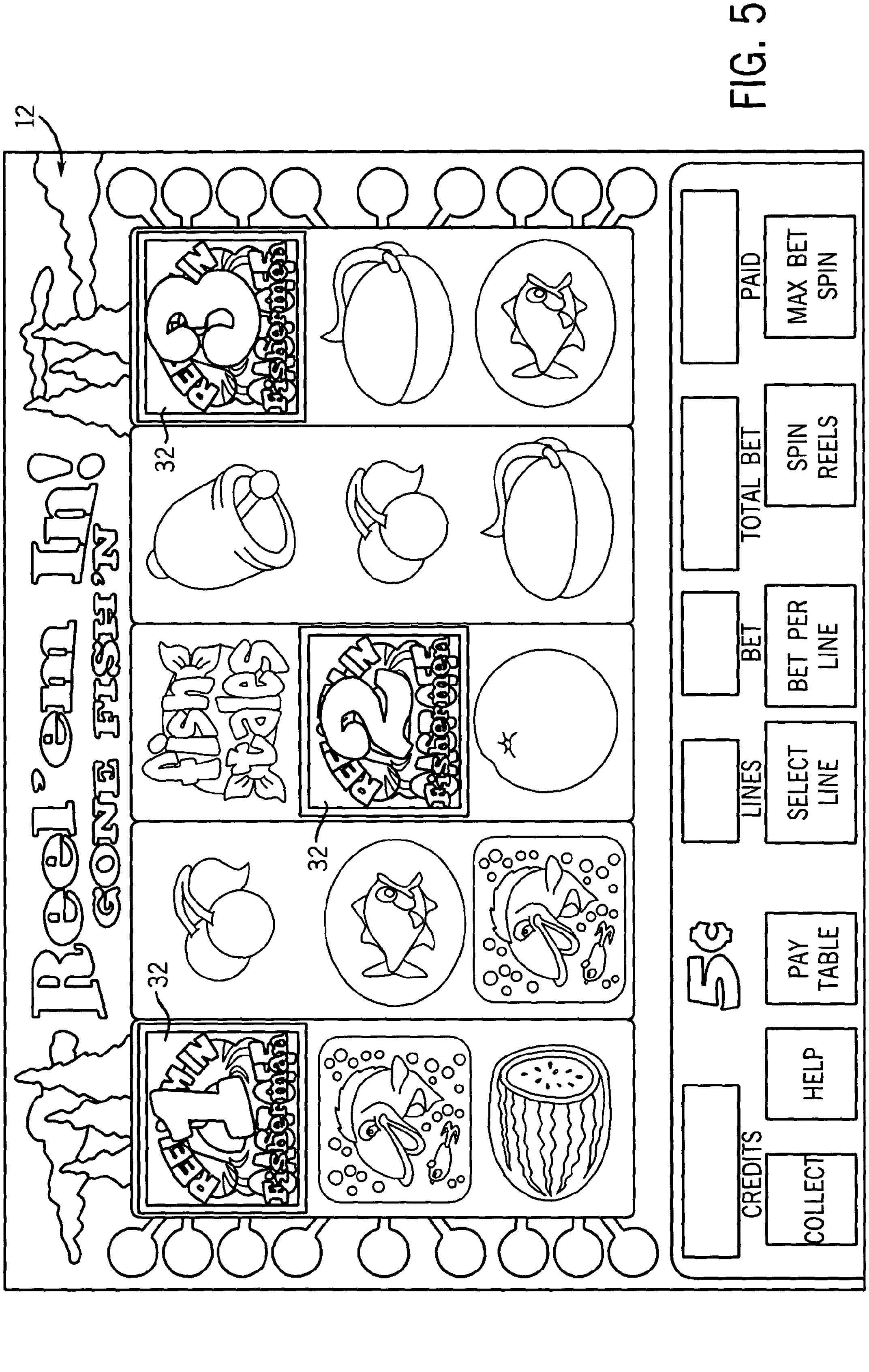
FIG. 5 is a display image showing the results of the initial bonus round player's selection.

The present invention provides a feature allowing the player to alter choices made at the beginning of a bonus round. In the following embodiments, an entertaining video reel slot game called "Reel em In! Gone Fish'n" provides a bonus round allowing the player to choose between one and three animated fishermen as "partners". FIG. 3 displays a reel combination that can trigger the bonus round. In this example, the display 12 reveals bonus symbols 30 in the first, third, and fifth reels. As will be appreciated by those with ordinary skill in the art, the manner in which the bonus is triggered can be determined by any combination of any number of bonus symbols as defined by the reel slot video game and presented in the pay table or game instructions. The display 12 in FIG. 4 now prompts the player to choose one of the bonus symbols 30. FIG. 5 shows the results of the player's choice. In this instance, the player has chosen the bonus symbol 30 on the middle reel revealing that two fishermen will be the player's "partners". The bonus symbols 30 on the first and fifth wheel reveal the number of "partners" the player would have received had either of those symbols been chosen.

Figure 6A:
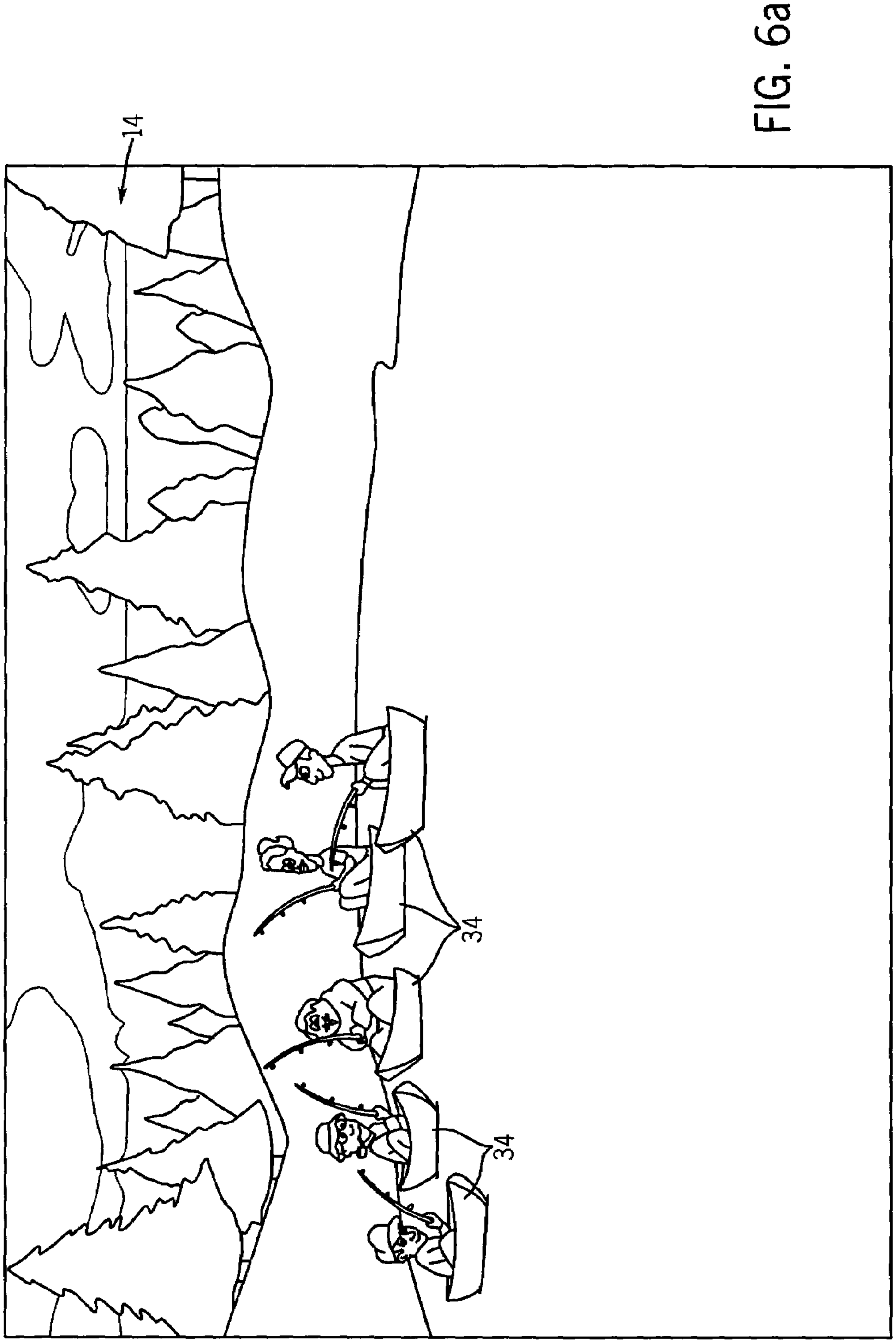
FIGS. 6*a* and 6*b* are display images of the top and bottom screens (respectively) of the gaming machine showing the next bonus round player's selection.
Figure 6B:
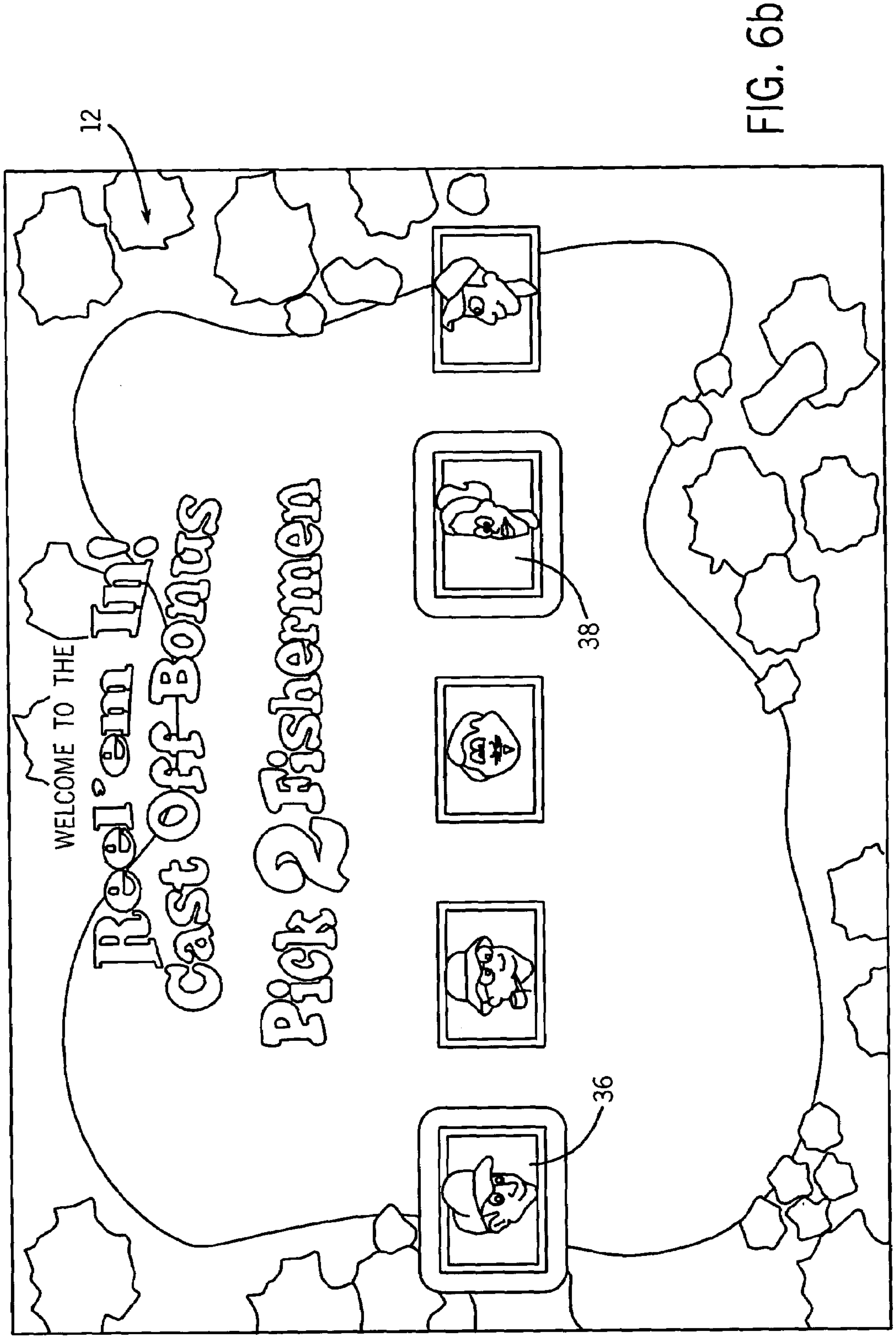

FIGS. 6*a* and 6*b* are presented simultaneously on top box display 14 and main game display 12 respectively. FIG. 6*a* shows a group of animated fishermen 34 on an animated pond "waiting" to "fish" for credits. FIG. 6*b* displays each of the fishermen as individual buttons and prompts the player to select two as determined by the player's selection in FIG. 5. In this instance, fisherman 36 and fisherman 38 are selected.

Figure 7A:
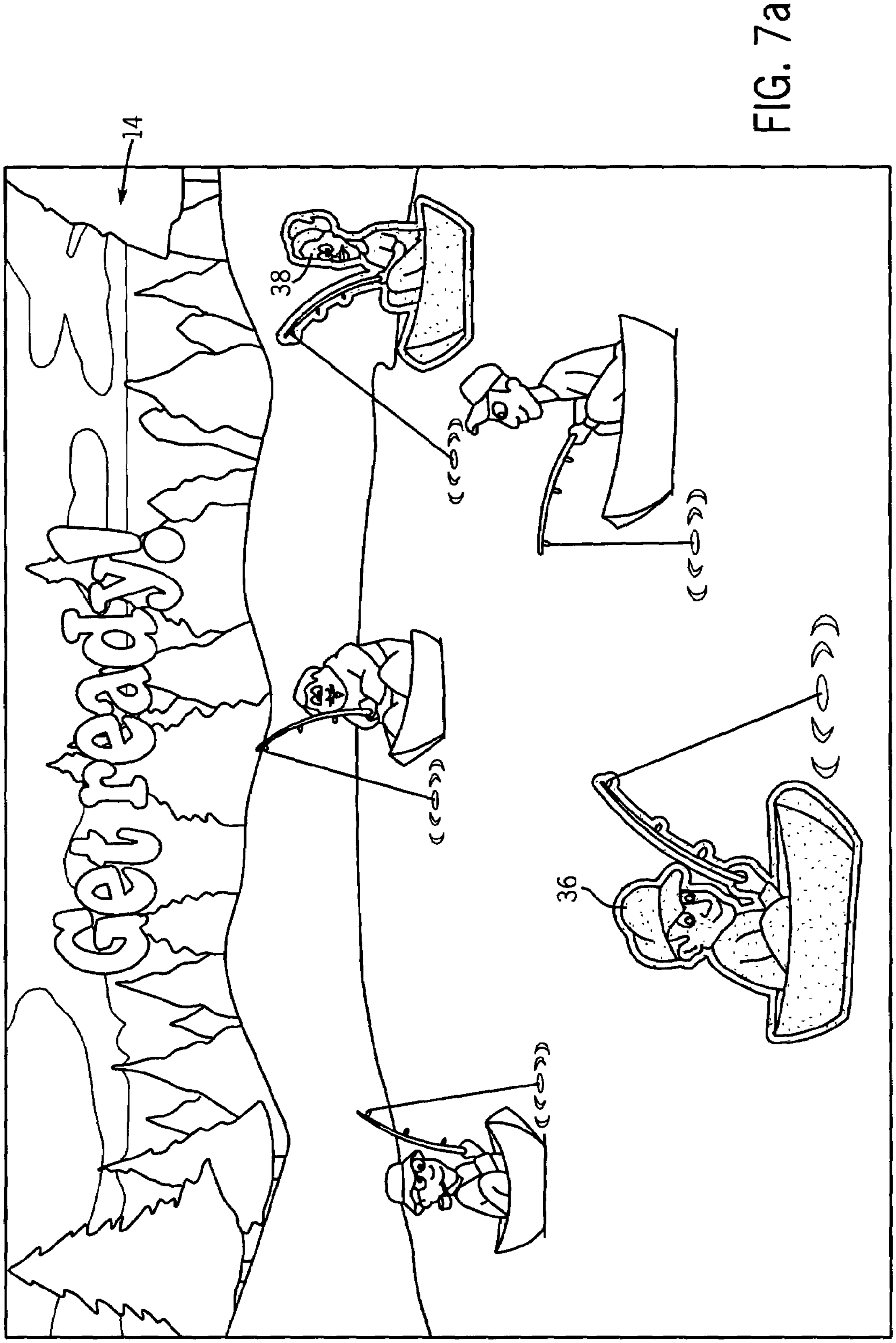
FIGS. 7*a* and 7*b* are display images of the top and bottom screens (respectively) of the gaming machine showing the bonus round player's selections as the bonus round begins.
Figure 7B:
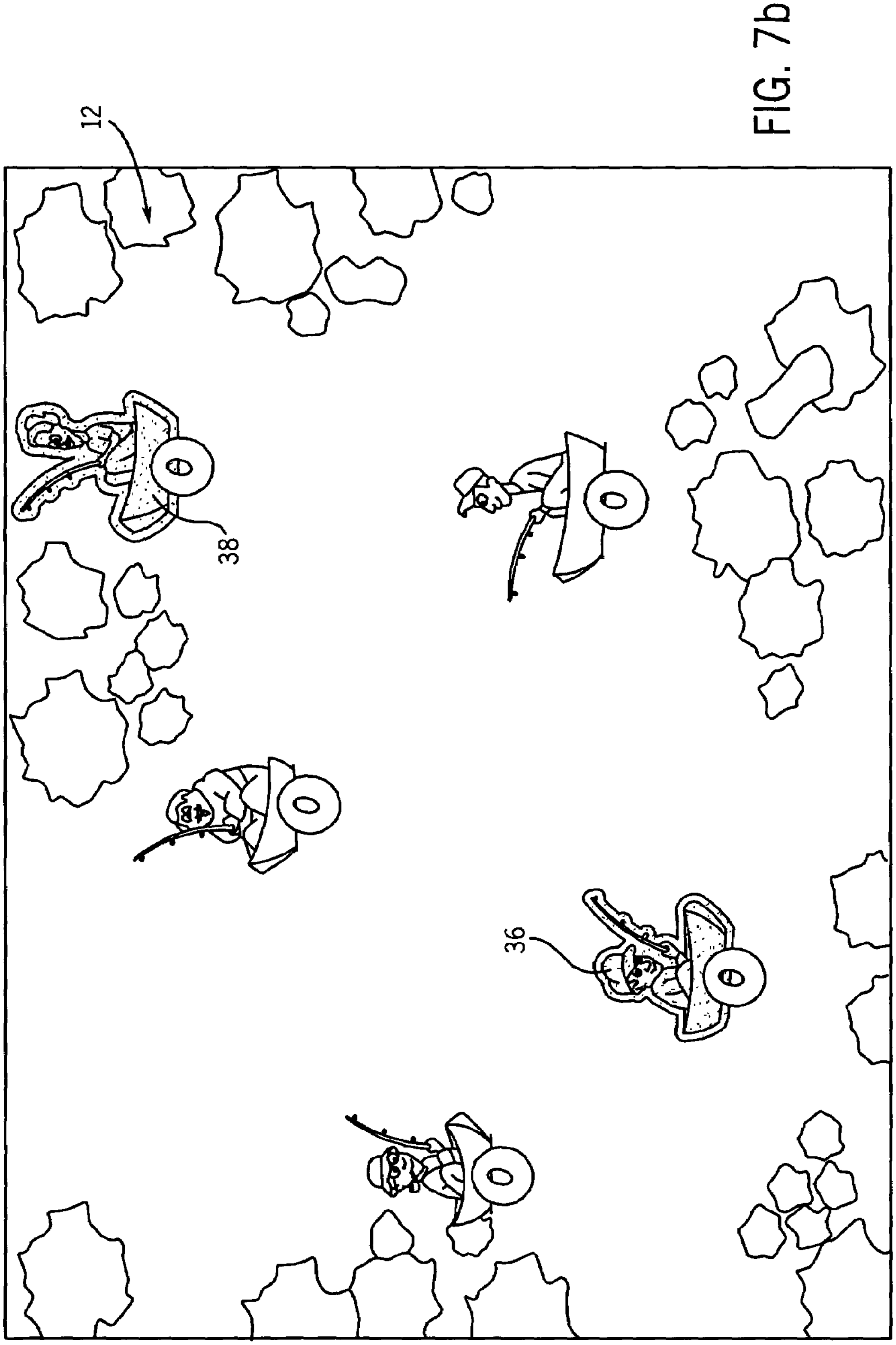

FIGS. 7*a* and 7*b* are presented simultaneously on top box display 14 and main game display 12 respectively. FIG. 7*a* shows the fishermen, having moved out onto the pond, beginning to "fish". The two fishermen selected by the player, fisherman 36 and fisherman 38, are highlighted for easy recognition. FIG. 7*b* also highlights fisherman 36 and fisherman 38 and displays a credit count with all the displayed fishermen.

Figure 8A:
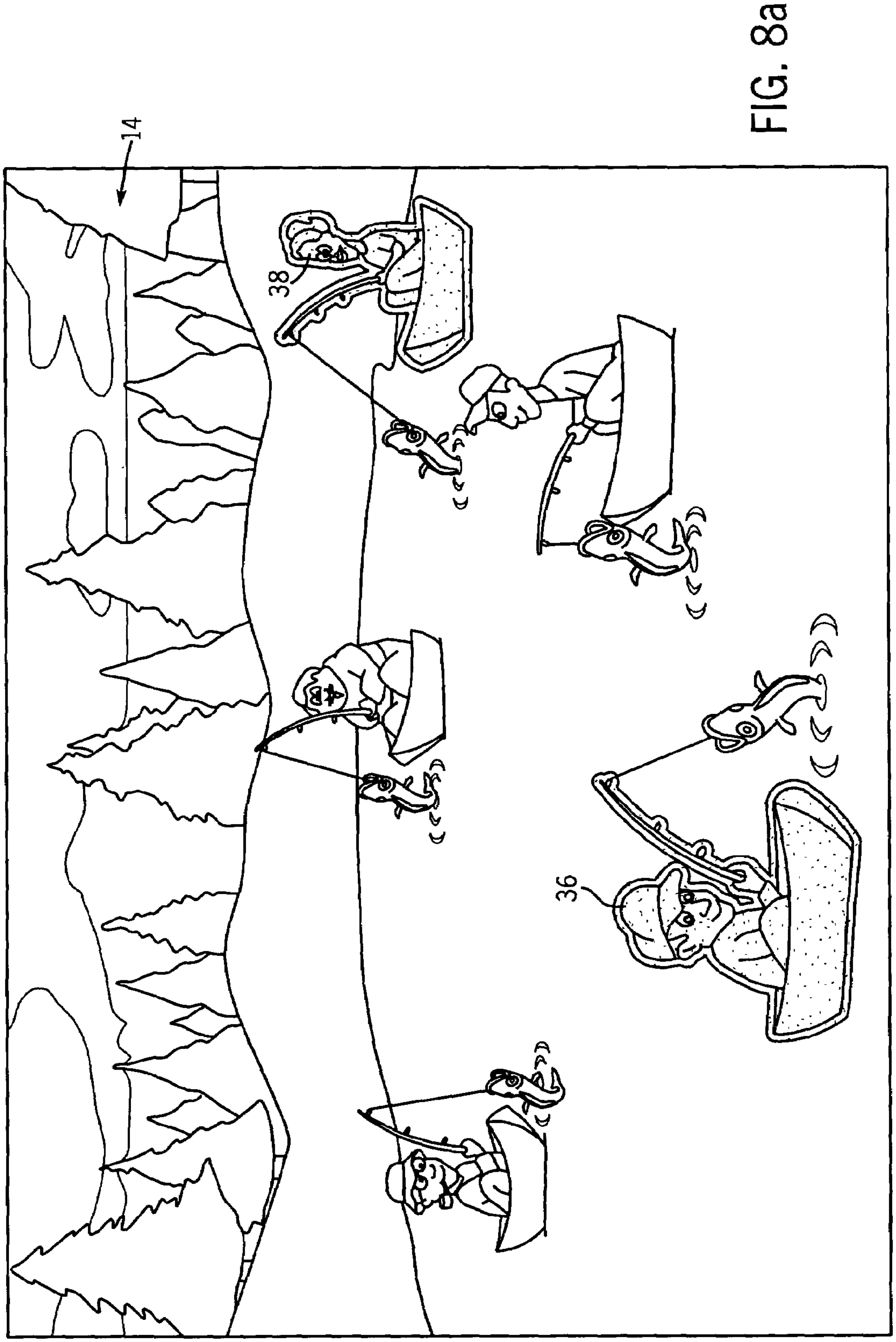
FIGS. 8*a* and 8*b* are display images of the top and bottom screens (respectively) of the gaming machine showing the bonus round player's selections accumulating credits.
Figure 8B:
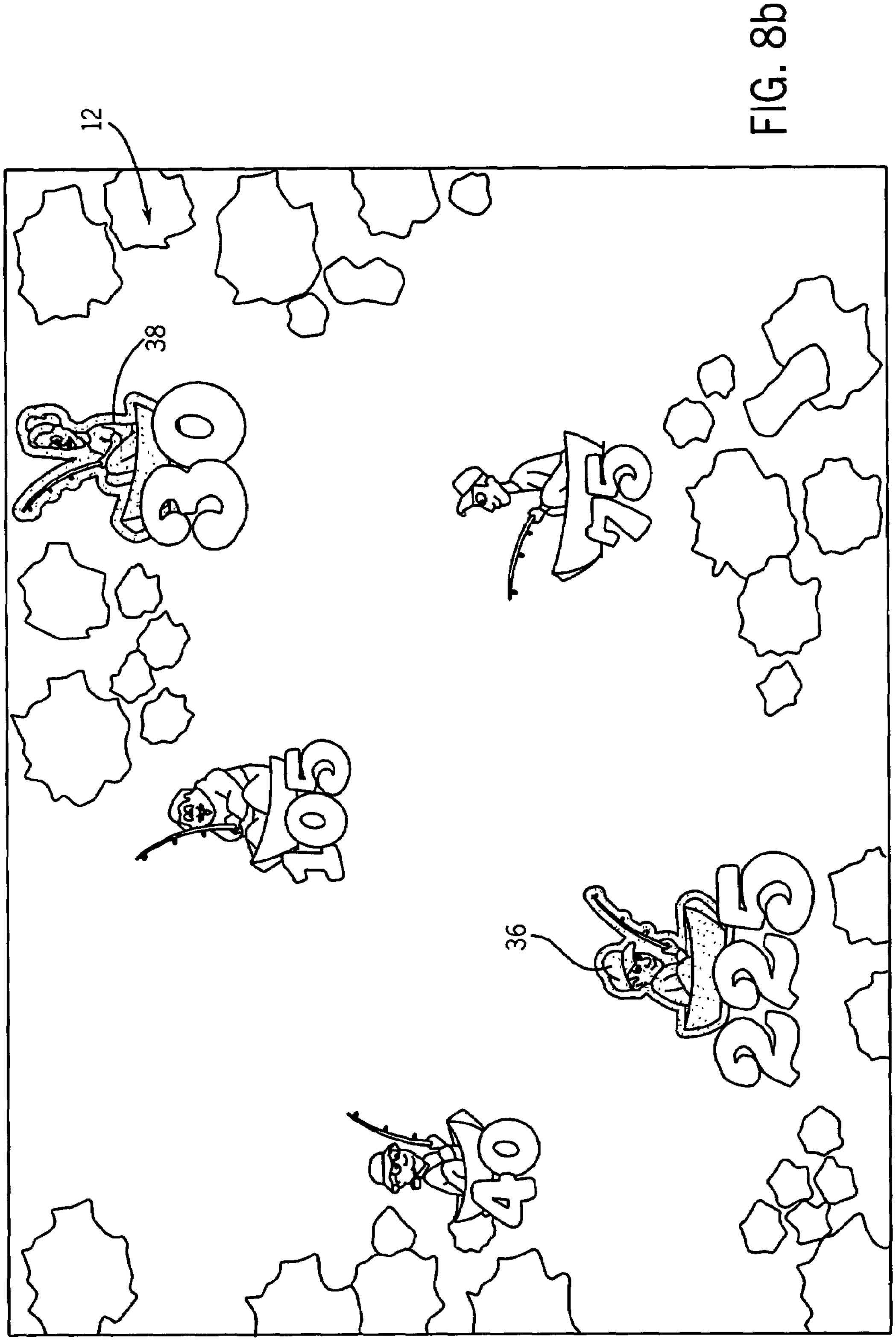

FIGS. 8*a* and 8*b* are presented simultaneously on top box display 14 and main game display 12 respectively. FIG. 8*a* shows the animated fishermen beginning to "catch" fish. The two fishermen selected by the player, fisherman 36 and fisherman 38, are still highlighted. FIG. 8*b* shows the accumulation of credits beside each fisherman. The selected fishermen, fisherman 36 and fisherman 38, display a credit count of 225 and 30 respectively.

Figure 9A:
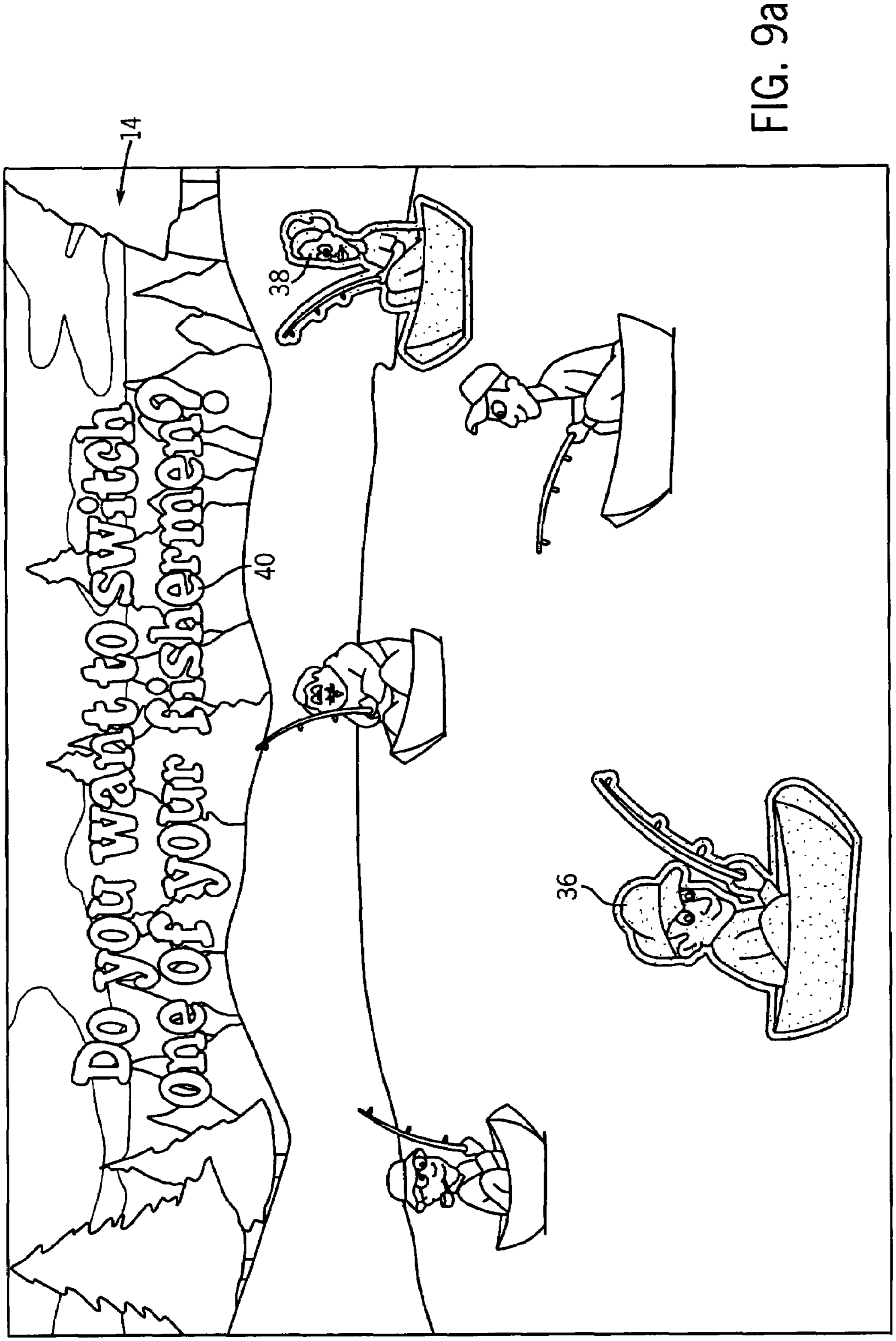
FIGS. 9*a* and 9*b* are display images of the top and bottom screens (respectively) of the gaming machine showing a bonus round prompting the player to keep or change the current selections.
Figure 9B:
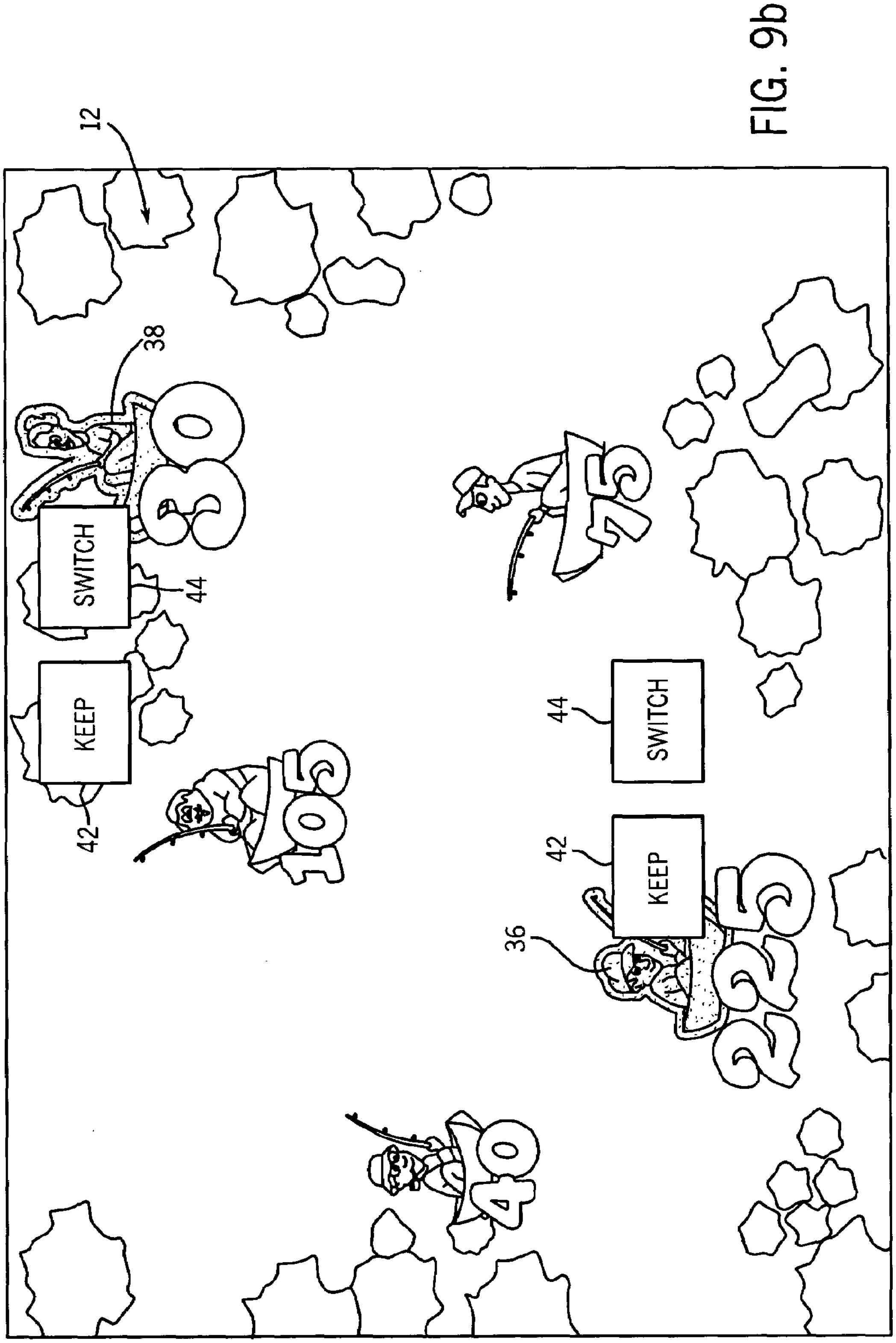

At this point during the bonus round, the game pauses and the player is prompted to keep or change the selected "partners". FIGS. 9*a* and 9*b* are presented simultaneously on top box display 14 and main game display 12 respectively. FIG. 9*a* shows all the fishermen having paused from their fishing activities. The game now "asks" the player, using a visual question 40, if a new partner should be switched for an existing one. The player now has the opportunity to review the current credit count for each fisherman (shown in display 12), and decide if a change should be made. FIG. 9*b* shows a keep button 42 and a switch button 44 next to the initially selected fishermen 36, 38. The player now selects a button next to each of the current "partners". In this example, the player chooses to keep fisherman 36 with 225 accumulated credits and switch fisherman 38 with 30 accumulated credits for another fisherman.

Figure 10A:
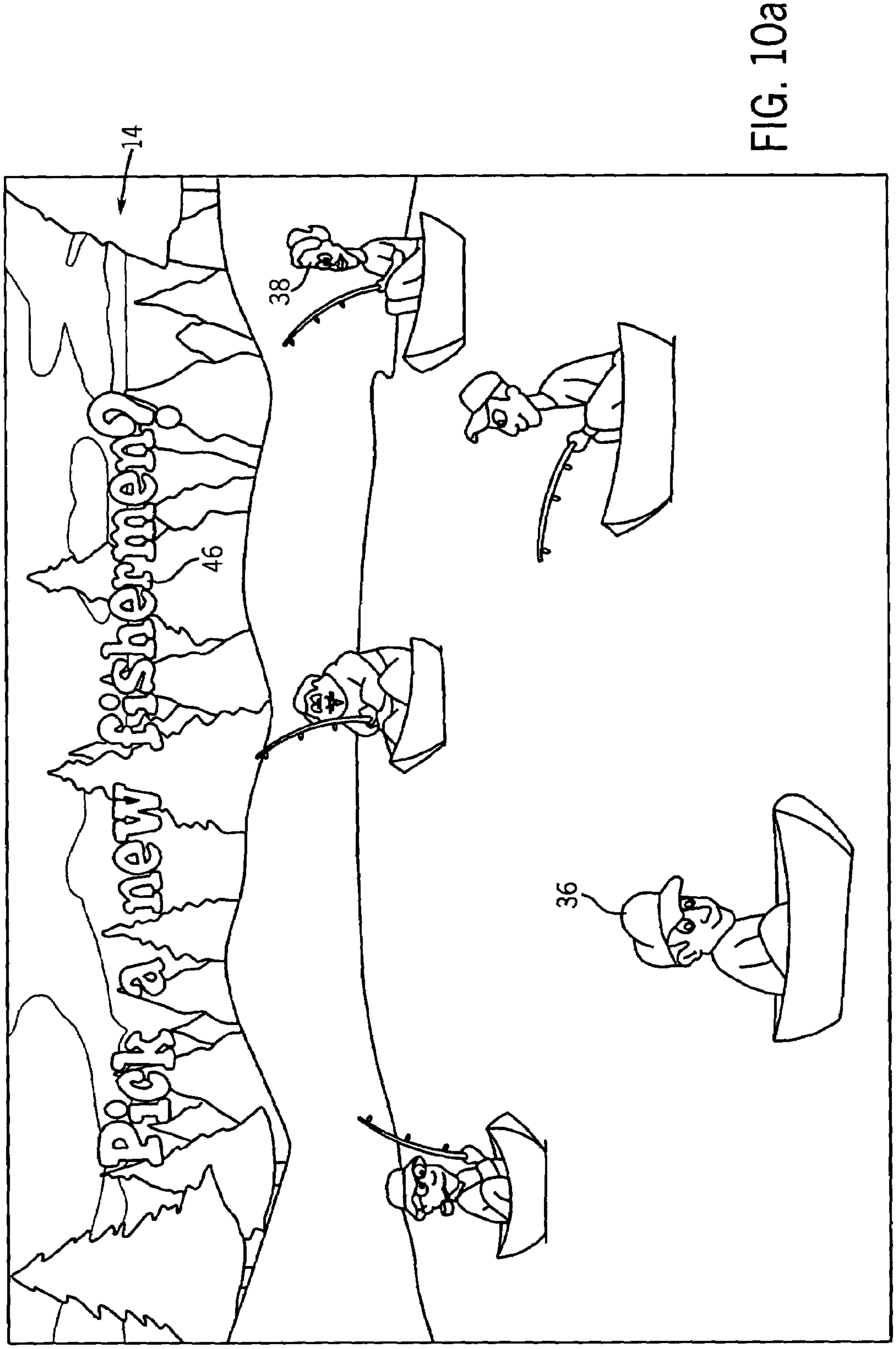
FIGS. 10*a* and 10*b* are display images of the top and bottom screens (respectively) of the gaming machine showing the query and available choices when a change has been requested.
Figure 10B:
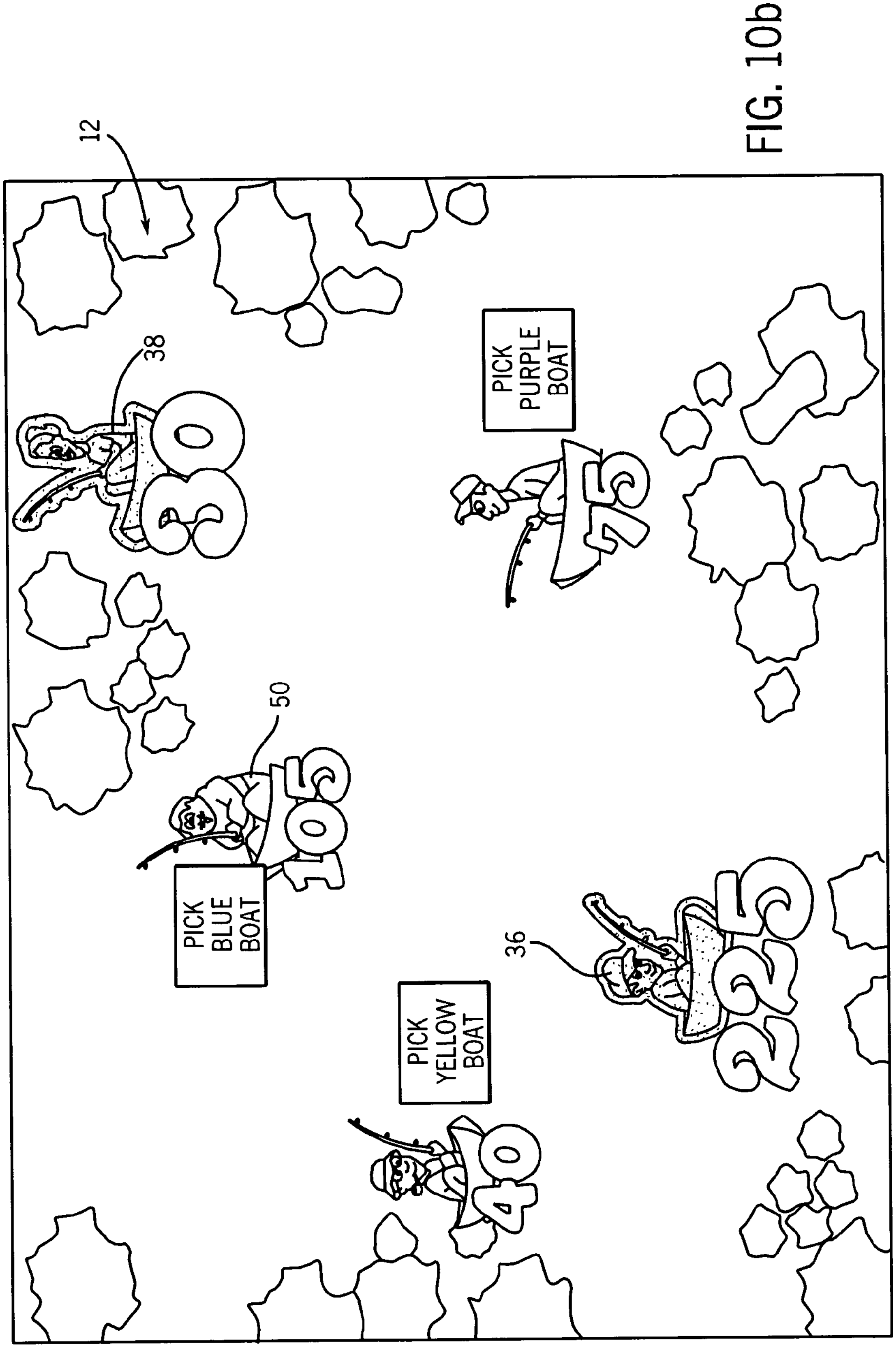

FIGS. 10*a* and 10*b* are now presented simultaneously on top box display 14 and main game display 12 respectively. In FIG. 10*a*, all fishermen are displayed in equal light with the fisherman 36 altered slightly (in this case, without fishing pole) to identify it as a current "partner". FIG. 10*b* shows the originally chosen fishermen 36, 38 highlighted in two different colors. Fisherman 36, kept by the player as a "partner" to continue the round, is highlighted in green. Fisherman 38, chosen by the player to be switched for another fisherman, is highlighted in red. As will be appreciated by those with ordinary skill in the art, the manner by which the selections are identified can be displayed in a variety of ways that would be recognizable to the player. For example, the fisherman being switched by the player could be dimmed or grayed out to make it apparent to the player that this choice is no longer available. The three fishermen available for choosing by the player to continue the round have selection buttons 48 displayed next to them. In this example, the player selects fisherman 50.

Figure 11A:
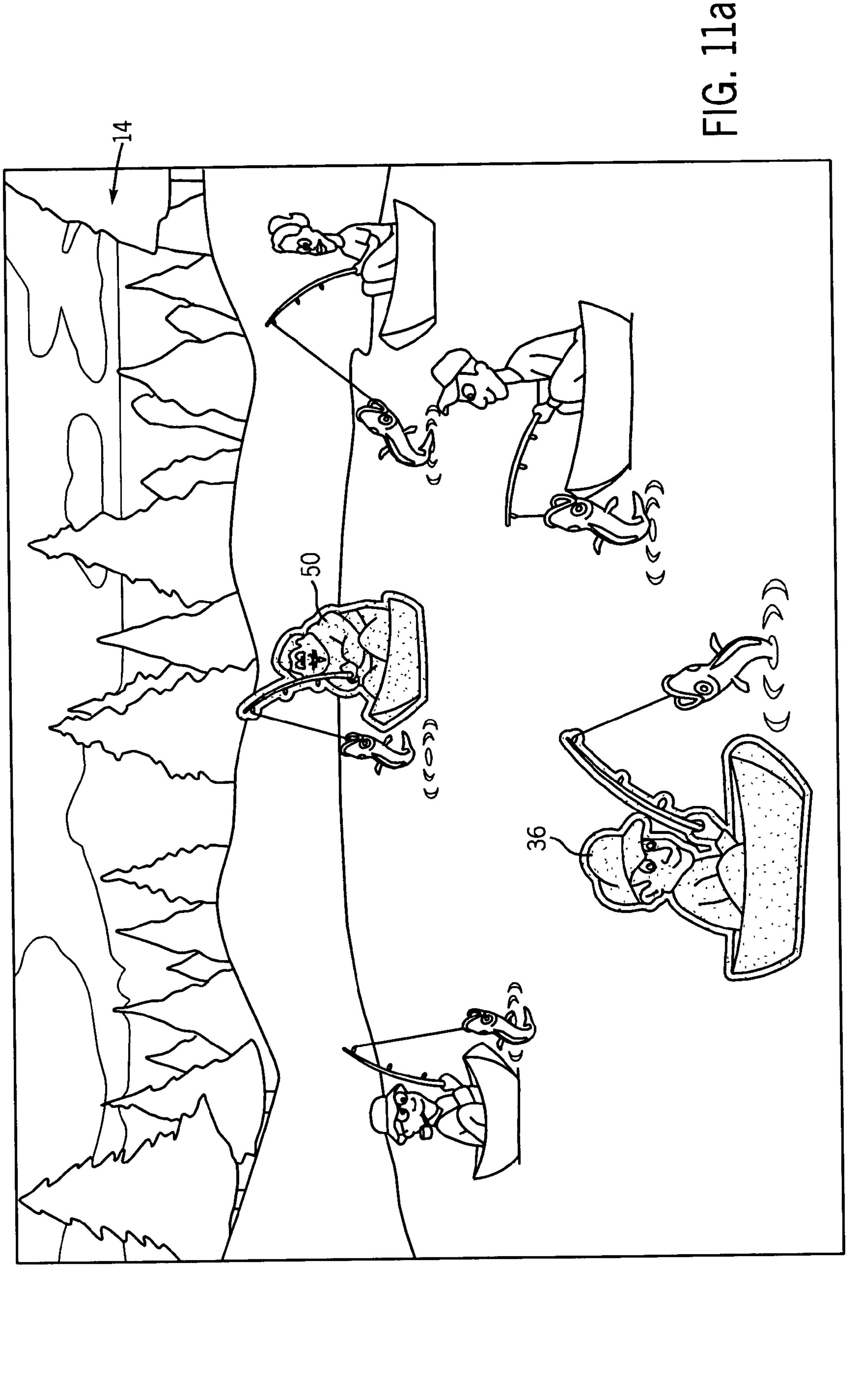
FIGS. 11*a* and 11*b* are display images of the top and bottom screens (respectively) of the gaming machine showing the post-change selection(s) highlighted.
Figure 11B:
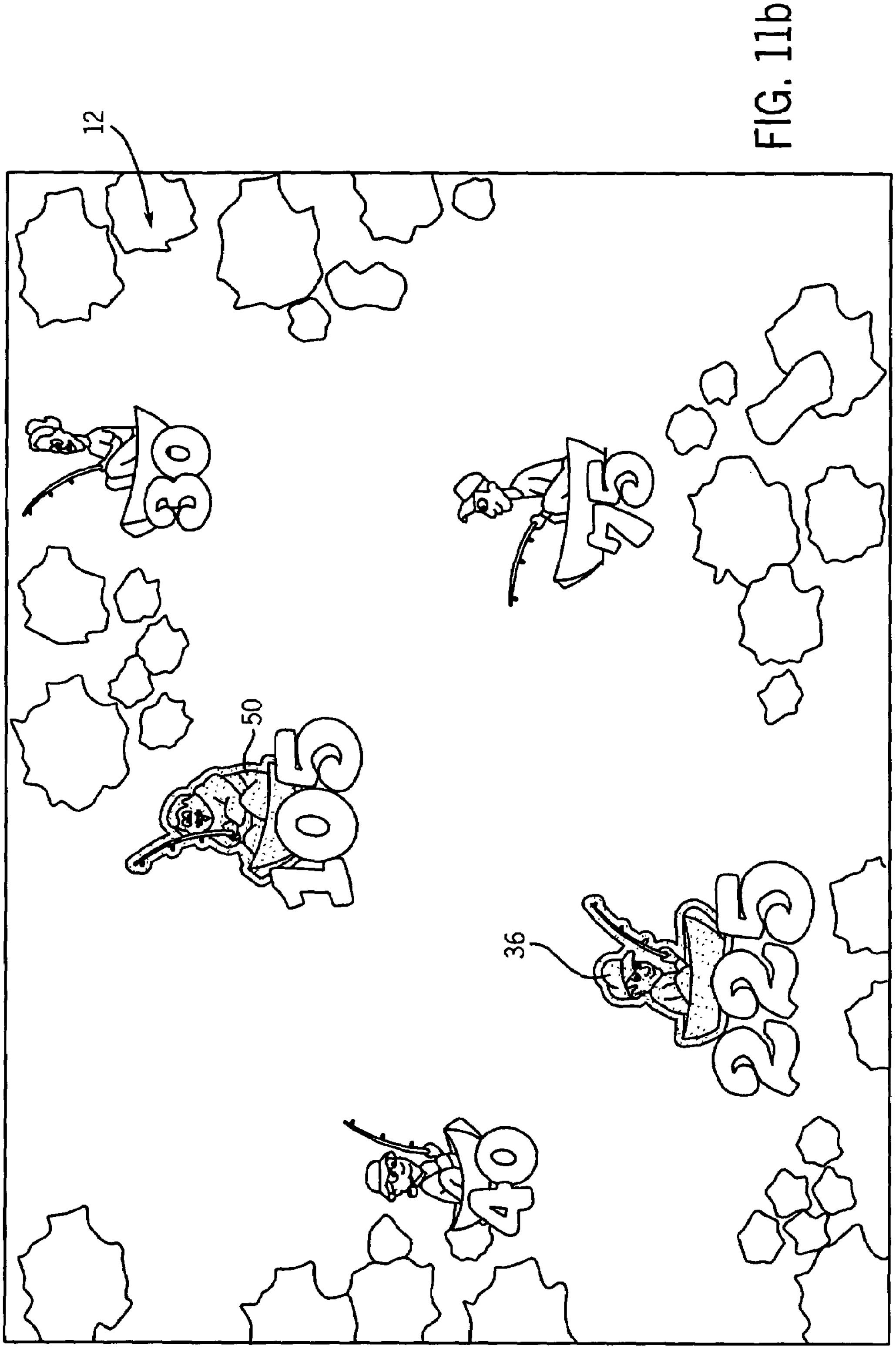

FIGS. 11*a* and 11*b* are now presented simultaneously on top box display 14 and main game display 12 respectively. FIG. 11*a* shows all the fishermen "fishing" again with the originally chosen fisherman 36 and the newly chosen fisherman 50 highlighted. FIG. 11*b* shows the current credit values associated with each fisherman and shows the currently selected fishermen 36, 50 highlighted. As the bonus round continues, the credit values continue to accumulate next to each fisherman.

Figure 12A:
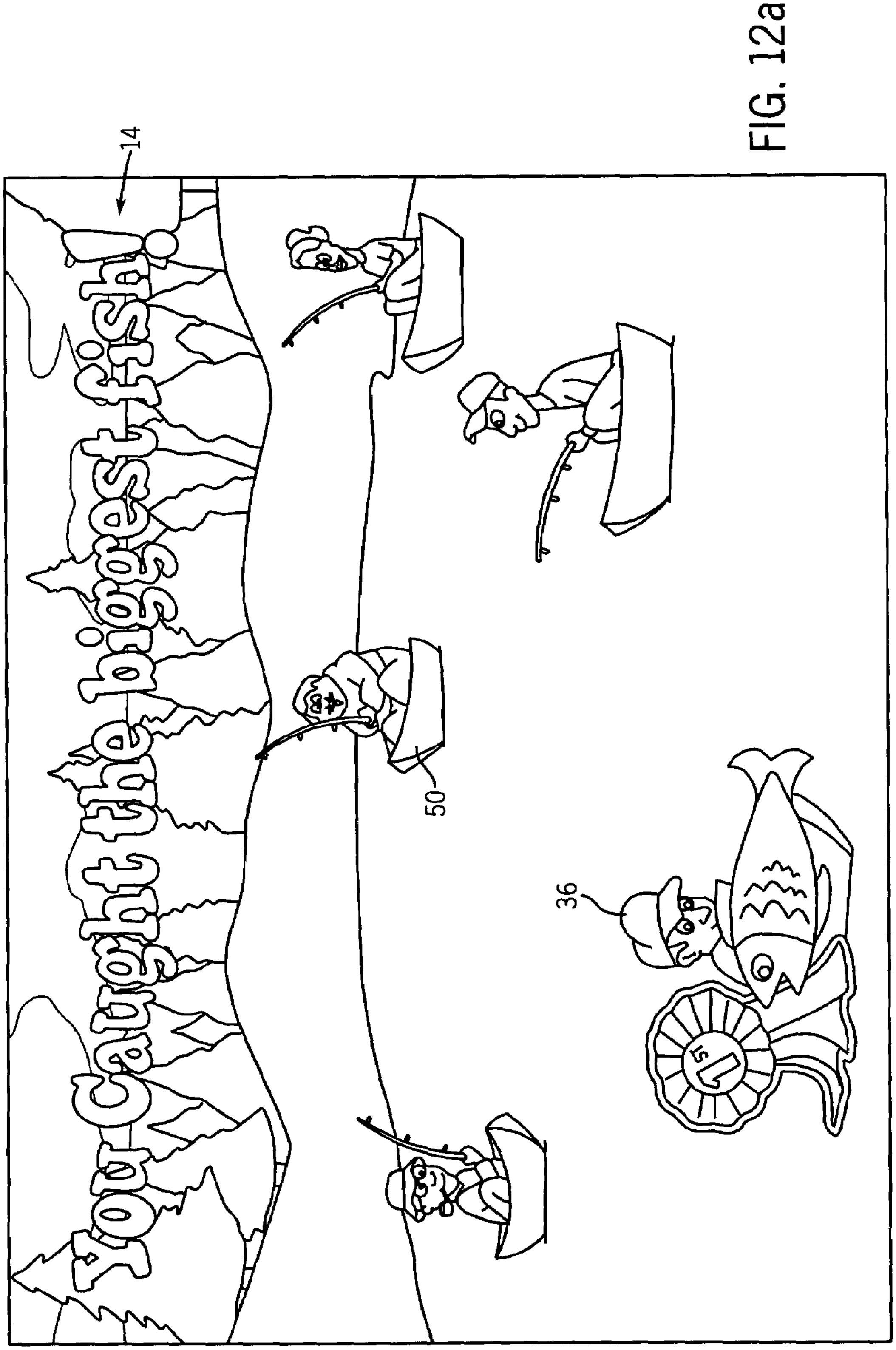
FIGS. 12*a* and 12*b* are display images of the top and bottom screens (respectively) of the gaming machine showing the outcome of the bonus round.
Figure 12B:
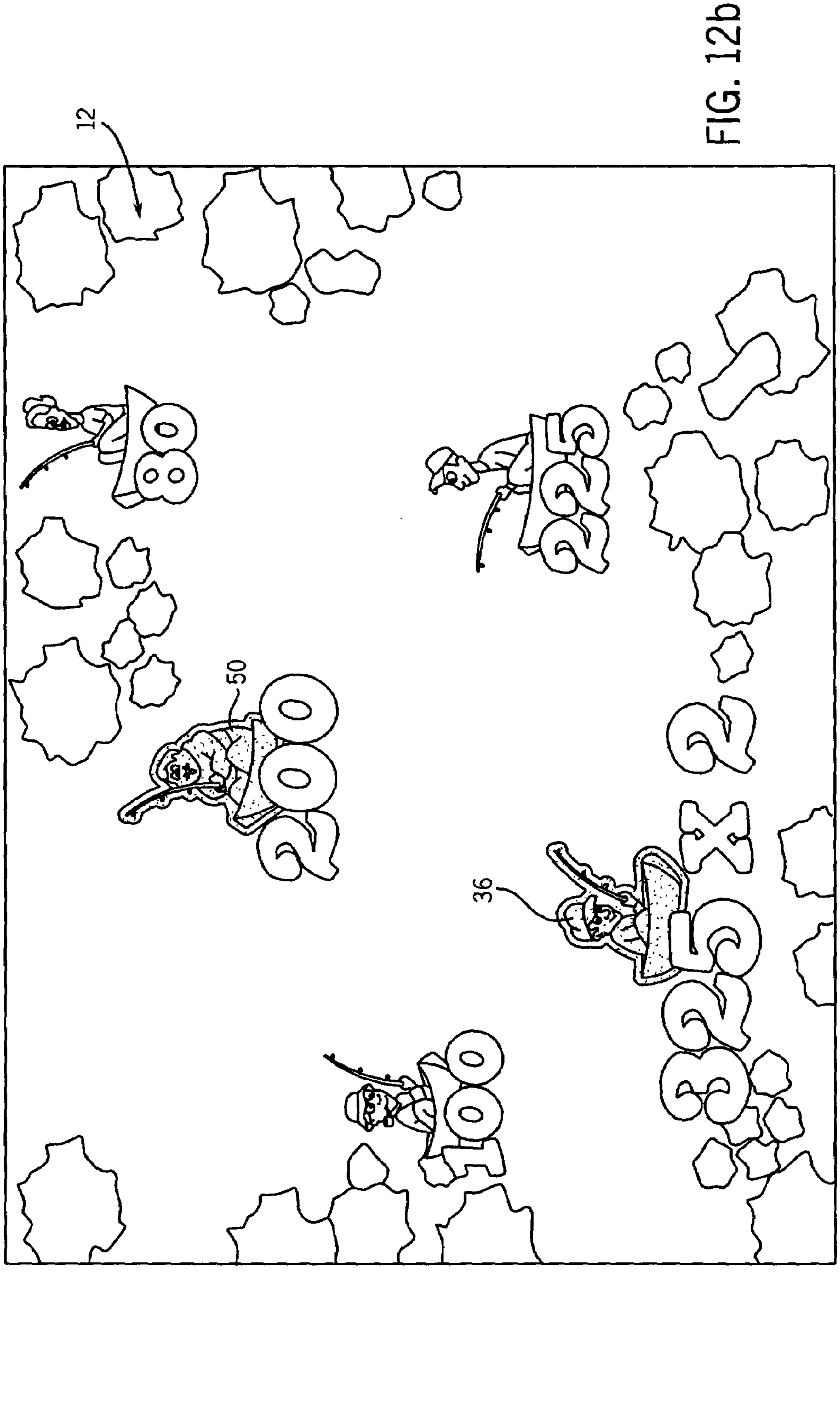

The completion of the bonus round is displayed in FIGS. 12*a* and 12*b*. FIGS. 12*a* and 12*b* are presented simultaneously on top box display 14 and main game display 12 respectively. FIG. 12*a* shows the fisherman who accumulated the most credits, displaying a large fish and $1^{st}$ place ribbon. In this example, the winning fisherman is the original fisherman 36 chosen by the player. FIG. 12*b* shows the final credit accumulations for all of the fishermen. Fisherman 50 finished the bonus round with 200 credits. Fisherman 36 finished the bonus round with 325 credits and since this selection accumulated the highest number of credits, it also receives a multiplier (2×) bonus making the credits won for fisherman 36 a total of 650. Total credits accumulated and won by the player for this bonus round are 850.

While the present invention has been described with reference to one or more particular embodiments, those skilled in the art will recognize that many changes may be made thereto without departing from the spirit and scope of the present invention.

For example, the number of times the bonus round pauses and offers the player the choice of changing "partners" can be once, twice, or many times based on the playability, entertainment value, and win-loss considerations for any game deploying this feature. If, for instance, the bonus game paused before awarding the multiplier bonus and prompted the player to keep or switch partners again, a second round of credit accumulation could occur increasing the player's bonus award. Various bonus levels could be specified to determine the number of potential partner changes allowed in a bonus round. Also, limiting the number of partners switched during a bonus round could be implemented. If a player has multiple partners during the round and is prompted to switch, the game may only allow one partner to be changed.

Another variation to the partner-switching feature is to not display the accumulating credit values for the partners who weren't selected initially. This would create more of a chance element when changing an initial selection to a new partner with an unknown current credit value. Also, the multiplier bonus at the end of the round could be altered to reflect the number of times a partner was changed. For example, the player can be given the option of changing partners up to three times but every time it is done, the multiplier is reduced. If the multiplier starts at three or four times (3× or 4×), it could be reduced to 1× or no multiplier if all of the partner changes are used.

Combinations of all of the above variations could also be deployed.

Each of these embodiments and obvious variations thereof is contemplated as falling within the spirit and scope of the claimed invention, which is set forth in the following claims.

What is claimed is:

1. A method of conducting a wagering game, comprising:
- receiving a wager to play the wagering game;
- displaying a plurality of incomplete offers;
- allowing a player to accept at least one of the plurality of incomplete offers to form an accepted offer;
- after the player accepts the incomplete offer, completing the plurality of incomplete offers to form a plurality of completed offers; and
- awarding the accepted offer to the player.

2. The method of claim 1, wherein the plurality of incomplete offers are associated with respective awards that change after the player accepts the incomplete offer.

3. The method of claim 1, wherein the plurality of completed offers are associated with respective final awards that do not change.

4. The method of claim 1, further including conducting a basic game, the displaying step occurring in response to a special outcome in the basic game.

5. The method of claim 4, wherein the step of conducting a basic game includes rotating and stopping a plurality of simulated or physical reels to place symbols on the reels in visual association with a display area.

6. The method of claim 1, further including initially associating one or more of the plurality of incomplete offers with the player prior to the step of displaying the plurality of incomplete offers.

7. The method of claim 6, wherein the allowing step includes allowing the player to change which of the plurality of incomplete offers is associated with the player.

8. A gaming apparatus for conducting a wagering game, comprising:
- a value input device for receiving a wager to play the wagering game;
- a display for displaying a plurality of incomplete offers; and
- a processor operative to
  - allow a player to accept at least one of the plurality of incomplete offers to form an accepted offer;

after the player accepts the incomplete offer, complete the plurality of incomplete offers to form a plurality of completed offers; and award the accepted offer to the player.

9. The apparatus of claim 8, wherein the plurality of incomplete offers are associated with respective awards that change after the player accepts the incomplete offer.

10. The apparatus of claim 8, wherein the plurality of completed offers are associated with respective final awards that do not change.

11. The apparatus of claim 8, wherein the processor is operative to conduct a basic game, and wherein the display is adapted to display the plurality of incomplete offers in response to a special outcome in the basic game.

12. The apparatus of claim 11, wherein the basic game includes a plurality of simulated or physical reels that are rotated and stopped to place symbols on the reels in visual association with a display area.

13. The apparatus of claim 8, wherein the processor is operative to initially associate one or more of the plurality of incomplete offers with the player prior to the display displaying the plurality of incomplete offers.

14. The apparatus of claim 13, wherein the processor is operative to allow the player to change which of the plurality of incomplete offers is associated with the player.

15. A method of conducting a wagering game, comprising:

receiving a wager to play the wagering game;

initially associating one or more of a plurality of incomplete offers with a player;

displaying the plurality of incomplete offers;

allowing the player to change which of the plurality of incomplete offers is associated with the player;

after the player changes which of the plurality of incomplete offers is associated with the player, completing the plurality of offers to form a plurality of completed offers; and awarding the associated offers to the player.

16. The method of claim 15, wherein the plurality of incomplete offers are associated with respective awards that change after the player changes which of the plurality of incomplete offers is associated with the player.

17. The method of claim 15, wherein the plurality of completed offers are associated with respective final awards that do not change.

18. The method of claim 15, further including conducting a basic game, the displaying step occurring in response to a special outcome in the basic game.

19. The method of claim 15, wherein the plurality of incomplete offers include respective credit amounts that accumulate at different rates on a display.

20. The method of claim 19, wherein each credit amount accumulates at a respective rate that fluctuates over time.

* * * * *